United States Patent Office 3,826,646
Patented July 30, 1974

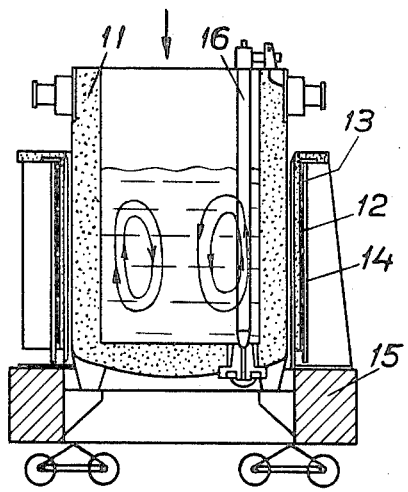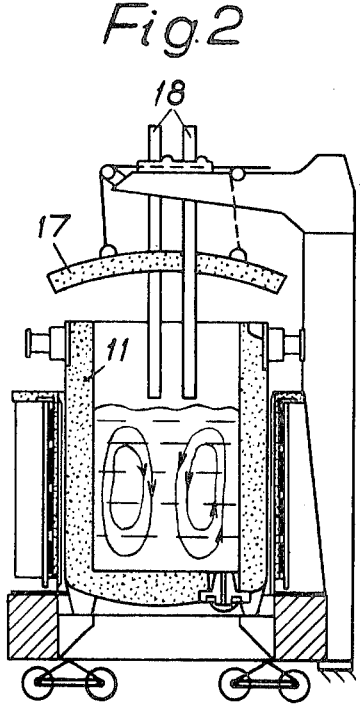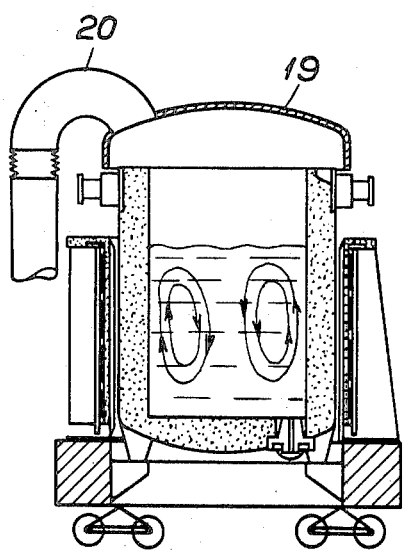

3,826,646
METHOD FOR TREATING MELTS AND MEANS FOR CARRYING OUT THIS TREATMENT
Gosta Karlsson, Harnevigatan 26; Per Samuelsson, Bangatan 17; and Per Erik Hammarlund, Hasselvagen 6, all of Vasteras, Sweden
Continuation of application Ser. No. 866,161, Oct. 13, 1969, which is a continuation of application Ser. No. 538,633, Mar. 30, 1966, both now abandoned. This application Mar. 26, 1973, Ser. No. 344,514
Int. Cl. C21c 5/52, 7/10
U.S. Cl. 75—13        6 Claims

ABSTRACT OF THE DISCLOSURE

Molten metal is heated in a covered ladle equipped with electrodes and multi-phase electromagnetic stirring coils. Energization creates a toroidal pattern of movement within the melt. The melt is then degassed by the evacuation of the space over the melt.

---

Figure 4:
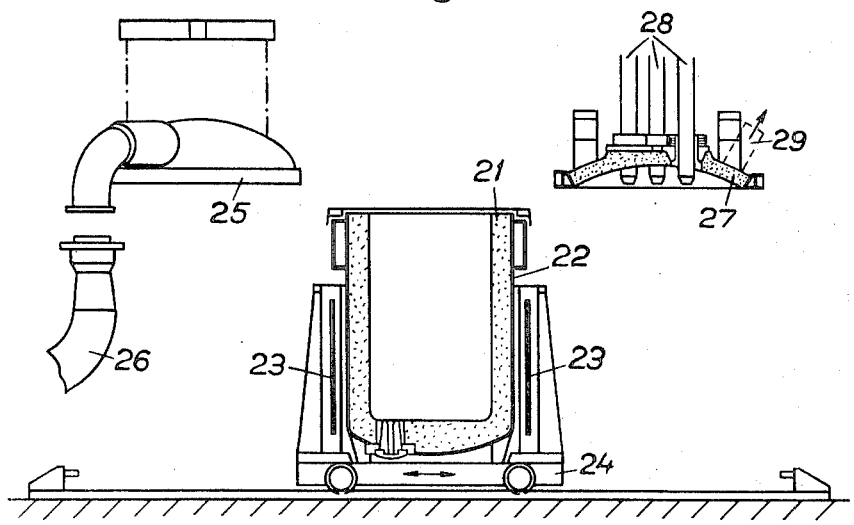

This application is a continuation of Ser. No. 866,161, filed Oct. 13, 1969, and now abandoned, which application is a continuation of Ser. No. 538,633, filed Mar. 30, 1966, and now abandoned.

The present invention relates to a method for treating melts of metal or metal alloys, such as steel melt. The invention also relates to a means for carrying out this method.

Many ways of refining melts are known, for example degassing in an arc furnace during simultaneous stirring. Such a unit is however relatively complicated from the point of view of construction. It is known per se to degas steel melts under vacuum and stirring, such as electro-magnetic multi-phase and low frequency stirring, and thus a high class product can be obtained, but this is based on the assumption that earlier in the process, besides the melting, malleablising, slag reactions and analysis adjustments are carried out. For this, besides ordinary arc furnace plants, it is usually necessary to have partly completely separate malleablising and slag reaction units and partly separate stirring de-gassing units, which demands relatively large investments.

The invention is based on a method in which malleablising, slag reaction and possible analysis adjustment processes may be carried out in close connection with the degassing and stirring. The method is characterized in that untreated melt is tapped into a crucible or ladle with a non-magnetic metallic shell (for example of stainless steel) outside which is placed an electro-magnetic stirrer together with the ladle, movable on a carriage or the like, after which the movable unit is moved to a heating position at which electrodes are placed over the melt in order to effect malleablising, slag reactions and possible analysis adjustments in the melt during the stirring of the melt, after which the unit is moved to a degassing position where it is provided with a vacuum-tight closing cover with at least one evacuating tube or is placed in a vacuum tank so that the melt is degassed during stirring at vacuum, after which tapping, casing or the like occurs. By this method one stirrer is used for the whole process, but at the same time stirring as well as malleablising is produced during the degassing. During the malleablising thus homogenization of the melt as well as even heat distribution, and by choosing upward directed phase sequence for the stirring pole, radially inward directed bath and slag movements at the surface are produced, so that slag reactions at the ladle lining (see below) are avoided. During the degassing, motoric stirring with bath movement from the ladle bottom to the surface is obtained, i.e. the melt becomes completely subjected to the degassing at the bath surface.

The invention is also based on a method according to the above at which an untreated melt is tapped into a ladle (crucible), outside which is placed an electro-magnetic stirrer. The ladle is movable partly to a heating position at which the electrodes are adapted to the melt in order to effect heating, malleablising, slag reactions and possible analysis adjustments during stirring of the electrodes, and partly to a degassing position.

Sometimes it is desirable to carry out the degassing at relatively high vacuum, for example at 0.1 Torr, before the heating, but then there is a risk that in the last mentioned process the effect of the degassing becomes lost, i.e. the melt can once again take up the detrimental gasses from which it was previously freed (hydrogen, nitrogen, oxygen, carbon monoxide, etc.).

This invention is based on the elimination of the above given disadvantages and is characterised in that the arch with the through electrodes which are substantially gastight is connected to the ladle at the heating position, whereby either a certain degassing at underpressure (down to 50 to 100 Torr) and/or treatment in controlled atmosphere (the enclosed non-renewed air above the melt or another controlled atmosphere) can take place, and the degassing result is maintained from the proper degassing or is actually improved. By means of this gas-tight arch connection in certain cases a satisfactory treatment of the melt may also be obtained in a single stage, heating-degassing, without a separate degassing stage with high vacuum.

This invention may also be varied so that the ladle with the stirrer is fixed, while the gas-tight connectable cover (the arch) with the electrodes or the vacuum-tight connecting cover with at least one evacuating tube is turnably or otherwise movable to the ladle.

The invention also relates to a means for carrying out the method according to the above and is characterised in that the means comprises a ladle with metallic, non-magnetic wall and at least one multi-phase, electro-magnetic stirrer outside this, suitably placed around the ladle, together forming a movable unit, and a heating position for malleablising, slag reactions, etc., and possible analysis adjustments, consisting of a raisable and lowerable arch with electrodes for applying on the ladle; and a degassing position for the degassing of the melt during stirring, consisting of a connectable cover which is vacuum-tight against the ladle with at least one evacuating tube, or an evacuating tank in which the ladle can be placed; so that the unit is movable between these positions, the tapping and the casting positions, etc., suitably by means of a carriage supporting the ladle and the stirrer. Here it is thus not necessary to have one complete malleablising unit and one degassing unit, but by means of these constructions, the movable ladle-stirrer part can be combined in the same equipment, either by a heating unit with electrodes or a vacuum unit and stirring can be carried out all the time with the same stirrer. The stirring force is produced by using multi-phase current and low frequency (0.1–10 Hz.) and is obtained in the form of a moving field which moves axially and which draws the melt with it in the same way as the rotating field in the asynchronous motor draws the rotor with it. With only vacuum, it is true, a certain axial and upward directed flowing is produced, due to upward rising gas bubbles, for example in connection with the formation of CO, which effect is thus limited to the upper part of the melt, while the lower part of the melt on the other hand is not influenced, a disadvantage which is eliminated by means of motoric stirring. By means of the network frequency, multi-phase current it is also possible to produce certain stirring in the melt, but this becomes repulsive and certain parts of the melt will never come up to the surface, a disadvantage which is avoided due to the exceptionally low frequency 0.1–10 Hz. By making the ladle casing non-magnetic, the stirring force can penetrate the ladle wall and reach into the melt.

The invention is described in more detail in the accompanying figures, of which FIG. 1 shows the movable unit during tapping of the melt into the ladle, FIG. 2 the unit at the heating position and FIG. 3 the unit at the degassing position. FIG. 4 refers to the movable ladle and FIG. 5 to the fixed ladle. A crucible or ladle 11, suitably of tamping clay is placed inside a multi-phase stirrer coil 12 for low frequency (0.1–10 Hz.) with accompanying ceramic protection 13 and iron core 14, suitably one or several coils, placed cylindrically round the ladle. The ladle 11 plus the stirrer with its auxiliary parts are placed on a carriage 15 with wheels movable between the different stations. The ladle is usually also provided with a stopper 16 (only shown in FIG. 1). The melt is poured (see arrow) from an above placed arc furnace, a ladle or the like, and stirring for making the melt homogeneous and even distribution of the temperature gradients is started. The direction of the stirring according to the figure is produced by upwardly directed phase sequence.

The unit on the carrier 15 is then moved to a heating position (FIG. 2) with a raisable and lowerable furnace arch 17 with electrodes 18 (Soderbergs electrodes or graphite electrodes). The arch 17 is lowered to contact the upper edge of the ladle 11 and the melt is heated by means of the arc from the electrodes, which are supplied with electrical energy. During this process malleablising can take place (possibly the blowing in of oxygen can also take place) together with suitable slag reactions and possible analysis adjustments. The stirring continues (see the arrows in FIG. 2) so that the temperature gradients are equally distributed, not least below the electrodes 18, and homogenization is obtained. By the inwardly directed bath movement at the surface, produced by upwardly directed phase sequence in the coil, slag reactions at the ladle wall are avoided.

When this part of the treatment of the melt is finished, the electrodes are disconnected and the arch 17 is raised, after which the unit is carried to the degassing position (FIG. 3). Here a vacuum-tight cover 19 is placed on the upper edge of the ladle 11 and a space is formed over the melt, which is evacuated through tube 20 from an evacuating pump, not shown, to a pressure below 50 Torr, suitably below 20 Torr, preferably below 0.1 Torr. By means of the even and continuous stirring (can possibly be interrupted during transport) $N_2$, $H_2$ and $O_2$, etc. are evacuated from the melt and a high class steel is produced. Certain heat retention is also produced from the stirrer.

When the desired degree of purity of the steel is produced, the melt is tapped into cast iron moulds or is cast into the desired shape, after which the unit is ready for new melt to be tapped into it.

A ladle 21 of tamping clay or brick with non-magnetic ladle wall, filled with untreated melt, such as steel melt, is inserted into or at an electro magnetic stirrer 23 (FIG. 4). The last mentioned can be cylindrical or one-sided in relation to the ladle 21 and can possibly be moved with the melt after the insertion. The ladle 21 with stirrer 23 (multi-phase, 0.1–5 Hz.) is placed on a movable carriage 24, movable between a degassing position for vacuum degassing to a pressure below 20 Torr, suitably below 0.1 Torr. It comprises a closing cover 25 connected in a vacuum-tight way to the ladle 21, lowerable to sealing position, provided with one or several evacuating tubes.

The carriage 24 with the ladle 21 is also movable to a heating position with to a great extent gas-tight closing arch 27 with through electrodes 28, and to a great extent gas-tight controlled in the arch. The arch 27 is possibly provided with one or several evacuating tubes 29 and can be lowered to gas-tight closing position at the ladle 21.

The treatment according to FIG. 1 is started with the pouring in of the melt and placing the ladle 21 in the stirrer 23 on the carriage 24. The carriage with the ladle is moved to the degassing position and the closing cover 25 is pressed in a vacuum-tight way to the ladle 21, and the melt is degassed during the stirring.

The carriage 24 is then moved with the melt to the heating position and the swing arch (the closing cover) 27 is connected in a substantially gas-tight way to the ladle. The melt is heated by means of arcs from the electrodes 28 during stirring. Possibly the enclosed air over the melt is maintained without the entry of new air and is kept at or somewhat above atmospheric pressure, so that the purity of the melt with reference to gas inclusions can be maintained during the heating after the preceding degassing. Possibly here a certain vacuum can also be kept over the melt (evacuating via the tube 29) down to 100 to 50 Torr, not lower since the arcs do not burn in a concentrated way at lower pressure.

Instead of using the enclosed air without entry of new air, controlled atmosphere can also be used. The degassed and for the rest treated melt can then at a suitable place be tapped or cast. The carrying out of degassing (at 25) can in certain cases be omitted, or also the sequence of degassing-heating can be reversed.

Figure 5:
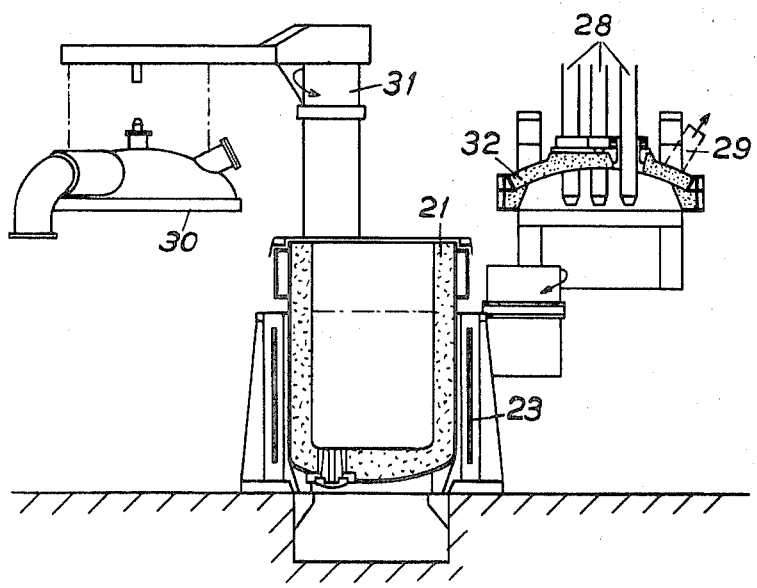

In FIG. 5 an alternative way is shown in which the ladle 11 is placed in a stirrer 23 and the ladle is fixed relative to the foundation. By means of a lifting device 31 a vacuum-tight closable cover 30 with at least one evacuating tube can be moved to the ladle, alternatively a swing arch 32 with electrodes 28 and at least one evacuating tube. The arch is substantially closed in a gas-tight way to the ladle after lowering by means of a lifting and/or turning device not shown.

The method and means according to the invention can be varied in different ways within the scope of the following claims. For example the cover closed in a vacuum-tight way can be replaced by a vacuum tank with evacuating devices in which the ladle with stirrer is introduced.

We claim:

1. Means for treating a molten metal or alloy, comprising a transportable and liftable ladle and a non-magnetic shell around the ladle, a multi-phase electromagnetic cylindrical stirrer having a substantial extension along the side wall of the ladle, said ladle and shell being removably insertable in said stirrer, said ladle and stirrer forming a unit movable between treatment stations, one treatment station comprising an elevatable cover with through electrodes dimensioned for application upon an upper edge of the ladle, another treatment station comprising a cover with at least one evacuaton conduit for vacuum-tight application upon an upper edge of the ladle, and at least one tapping station, said unit being movable between all said stations.

2. Means for treating molten metal or metal alloy, comprising a ladle and a metallic, non-magnetic shell around the ladle, a multi-phase electro-magnetic cylindrical stirrer having a substantial extension along the side wall of the ladle, said ladle and stirrer being arranged as a unit movable between the treatment stations, one treatment station comprising an elevatable cover with through electrodes dimensioned for application upon an upper edge of the ladle, another treatment station comprising a vacuum tank with at least one evacuation conduit, said ladle being movable into said tank, and at least one tapping station, said unit being movable between all said stations.

3. Method for treating a molten metal or alloy which comprises melting the metal, placing the molten metal in a transportable and liftable ladle having a non-magnetic shell, moving said ladle into a unit having a support means for removably holding said ladle and an electro-magnetic, multi-phase cylindrical stirrer having a substantial extension along the side wall of the ladle, said ladle positioned in said unit together with said stirrer being movable as a unit to two treatment positions comprising a heating position and a degassing position, moving said unit to the heating position, placing a heating cover with through-electrodes upon an upper edge of said ladle with the electrodes adjacent the melt, energizing said through-electrodes and said stirrer while said melt in the ladle is in the field of the electro-magnetic stirrer, thereby producing a toroidal pattern of movement within the melt, removing said heating cover, moving said unit with the ladle to a degassing position, placing a vacuum-tight degassing cover upon an upper edge of said ladle while in the field of the electro-magnetic stirrer, evacuating the space over the melt surface in said second position while energizing said stirrer in order to accomplish degassing of the melt, and tapping the melt after being in said two treatment positions from the ladle into at least one mold, the movement in the melt at least while the melt is in the heating position being downward in the center of the melt and upward along the sides of the melt.

4. In a method as claimed in claim 3, maintaining the melt in the ladle under the influence of the field of the stirrer during transport between said positions.

5. In a method as claimed in claim 3, feeding the stirrer, which comprises at least one stirrer coil, with a current at a frequency between 0.1 and 10 cycles per second.

6. In a method as claimed in claim 3, blowing in oxygen when the melt is in the heating position.

References Cited

UNITED STATES PATENTS

| | | | |
|---|---|---|---|
| 3,149,953 | 9/1964 | Nicholson | 75—49 |
| 3,180,633 | 4/1965 | Taylor | 75—49 |
| 3,352,655 | 11/1967 | Stenkvist | 75—49 |
| 3,235,243 | 2/1966 | Taylor | 75—49 |
| 3,676,105 | 7/1972 | McLeod | 75—13 |
| 3,572,671 | 3/1971 | Worner | 75—13 |
| 3,547,622 | 12/1970 | Hutchinson | 75—49 |
| 3,160,497 | 12/1964 | Loung | 75—13 |

OTHER REFERENCES

"Degas, Refine, Reheat in One Ladle," The Iron Age, vol. 196, pp. 48, 59 (December 1965).

HYLAND BIZOT, Primary Examiner

P. D. ROSENBERG, Assistant Examiner

U.S. Cl. X.R.

75—49, 61